United States Patent [19]

Verster

[11] Patent Number: 5,214,410
[45] Date of Patent: May 25, 1993

[54] LOCATION OF OBJECTS

[75] Inventor: Theunis C. Verster, Pretoria, South Africa

[73] Assignee: CSIR, Transvaal Province, South Africa

[21] Appl. No.: 549,749

[22] Filed: Jul. 9, 1990

[30] Foreign Application Priority Data

Jul. 10, 1989 [ZA] South Africa ............. 89/5229

[51] Int. Cl.$^5$ ............................................. G08B 13/14
[52] U.S. Cl. ................................... 340/572; 340/505
[58] Field of Search ............... 340/572, 573, 539, 505,
340/309.15, 518, 527, 825.69, 825.72, 825.2,
825.14; 342/44; 343/700 MS; 455/51, 140

[56] References Cited

U.S. PATENT DOCUMENTS

| | | | |
|---|---|---|---|
| 3,806,905 | 4/1974 | Strenglein | 340/505 |
| 4,249,167 | 2/1981 | Purinton et al. | 340/572 |
| 4,384,289 | 5/1983 | Stillwell et al. | 340/870.17 |
| 4,593,273 | 6/1986 | Narcisse | 340/572 |
| 4,612,534 | 9/1986 | Büehler et al. | 340/505 |
| 4,837,568 | 6/1989 | Snaper | 340/572 X |
| 4,918,425 | 4/1990 | Greenberg et al. | 340/539 |

FOREIGN PATENT DOCUMENTS 0172445 2/1986 European Pat. Off. .

OTHER PUBLICATIONS

"Invention to the Rescue", *Information News*, Winter 1987.

Primary Examiner—Jin F. Ng
Assistant Examiner—Thomas J. Mullen, Jr.
Attorney, Agent, or Firm—Harness, Dickey & Pierce

[57] ABSTRACT

A locating system 10 for locating predetermined labelled objects 20 includes a transceiver unit 12 which comprises a narrow beamwidth antenna 14 for transmitting an energizing signal 16 at a predetermined first frequency and for receiving a returned signal 22 at a predetermined second frequency from an object to be located, the energizing signal 16 incorporating a predetermined transponder category code. A plurality of label-like transponders 18 is provided, each of which is affixable to an object 20 to be located. Each transponder 18 includes logic circuitry in order that each transponder 18 in a predetermined group of labelled objects 20 constituting the category radiates a returned signal 22, including a transponder identification code, to the transceiver unit 12 in a time-delayed manner so that returned signals 22 are received serially by the transceiver unit 12.

17 Claims, 4 Drawing Sheets

LOCATION OF OBJECTS

FIELD OF THE INVENTION

This invention relates to the locating of objects. More particularly, the invention relates to a locating system for, and to a method of, locating predetermined labelled objects.

SUMMARY OF THE INVENTION

According to a first aspect of the invention, there is provided a locating system for locating predetermined labelled objects which includes a transceiver unit which comprises a narrow beamwidth antenna means for transmitting an energising signal at a predetermined first frequency and for receiving a returned signal at a predetermined second frequency from an object to be located, the energising signal incorporating a predetermined transponder identification code; and a plurality of label-like transponders each of which is affixable to an object to be located, each transponder including logic circuitry in order that only that transponder to which the said identification code relates is energised by the energising signal to radiate the returned signal.

Each transponder may be substantially omni-directional in order to operate effectively irrespective of the orientation of the object to which it is affixed relative to the transceiver unit. Preferably, the transponder may be small and flat so as to be easily affixable to the object without interfering with the object. Further, the transponder should be as cheap as possible and should operate equally well when affixed to metal, electrically insulating materials, or when freely suspended.

The above requirements may be satisfied by some form of suitable patch antenna and, hence, each transponder may include such a patch antenna. The patch antenna may be substantially C-shaped.

The logic circuitry may comprise a register means for receiving the predetermined transponder identification code from the transceiver unit via the energising signal. Additionally, the logic circuitry may include a comparator for comparing the received transponder identification code with a code stored in a memory means of the logic circuitry. In use, should the serial code correspond with the code stored in the memory means of the transponder, a switching means may be activated to cause the transponder to transmit the returned signal.

Further, in a development of the system, the system may be operable to search for and to locate predetermined objects within certain categories of objects.

In this development of the system, a category code may be stored in the memory means of the logic circuitry, the category code being comparable by the comparator with a predetermined encoded energising signal transmitted by the transceiver unit for facilitating location of predetermined objects within a predetermined category of objects. The logic circuitry may further include a time delay means, a different time delay being allocated to each transponder to delay the transmission of individual identification codes by the transponders by varying amounts of time such that the codes are received serially by the transceiver unit.

In this application of the system, the transceiver unit may be operable not only to "listen" for the acknowledgement of the presence of one pre-selected identification code, but also to pick up and to store individual identification codes of all the transponders within a pre-selected group of transponders.

Each transponder may include a switching means which is controlled by the logic circuitry, the switching means being activated by the logic circuitry to cause the returned signal to be radiated or transmitted. The switching means may be an RF switch.

The transceiver unit may be a portable unit which contains control electronics including data storage space, signal processing circuitry and transmitter/receiver circuitry.

The antenna means may comprise a single narrow-beam directional antenna which is used both for transmitting the energising signal and for receiving the returned signal or, instead, the antenna means may comprise two separate antennas.

In order to realise the necessary narrowbeam transmitter and receiver antennas so as to indicate direction of a response from the transponder, the said predetermined first frequency of the energising signal may fall within the UHF range. Then, the said predetermined second frequency of the returned signal may be an harmonic of the frequency of the energising signal. Preferably, the frequency of the returned signal is the third harmonic frequency of the energising signal.

According to a second aspect of the invention, there is provided a method of locating predetermined labelled objects which includes modifying an energising signal to incorporate a predetermined transponder identification code;

transmitting the energising signal via a narrow beamwidth antenna means at a predetermined first frequency; and receiving a returned signal at a predetermined second frequency radiated by a label-like transponder which is energised by the energising signal and to which the predetermined identification code relates, the said transponder being one of a plurality of such transponders each of which is affixed to an object to be located The method may include transmitting the signal at a frequency in the UHF range and causing the returned signal to be radiated at a frequency which is an harmonic of the energising signal. Preferably, the method may include causing the returned signal to be radiated at a frequency which is the third harmonic frequency of the energising signal.

Modifying the energising signal may be effected by modulating the predetermined transponder identification code onto the energising signal. The modulating of the signal may be effected by digital code modulating the amplitude or frequency of the energising signal.

Additionally, the method may include further modifying the energising signal in order to enable a range determination to be made. The further modifying of the energising signal may be effected by modulating a predetermined waveform, for example, a sinusoidal waveform onto the energising signal.

The invention is now described by way of example with reference to the accompanying diagrammatic drawings.

DETAILED DESCRIPTION OF THE DRAWINGS

Figure 1:
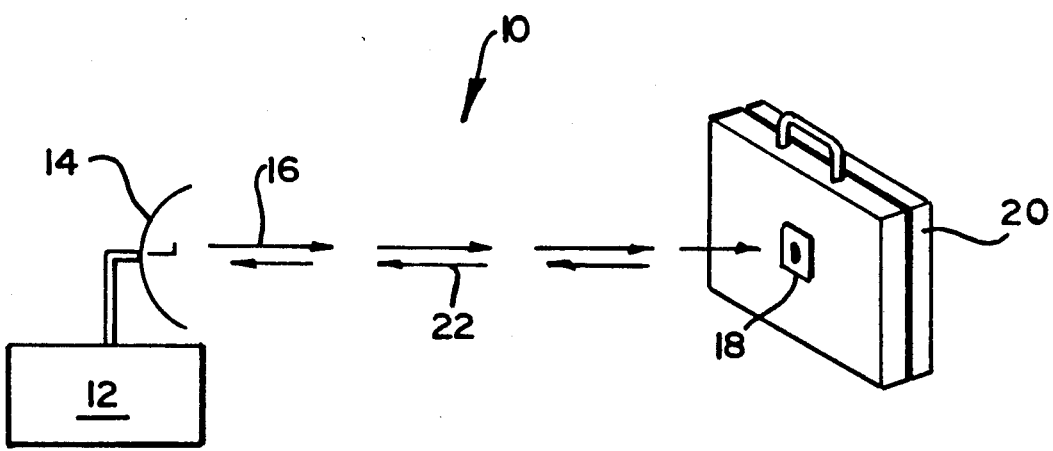
FIG. 1 shows, schematically, a locating system in accordance with the invention, for locating predetermined labelled objects.

Referring firstly to FIG. 1 of the drawings, a locating system, in accordance with the invention, is shown and is designated generally by the reference numeral 10. The locating system 10 generally comprises a portable transceiver unit 12 having an antenna means 14 for transmitting an energising signal 16 at a first predetermined frequency falling within the UHF range and preferably having a frequency in the region of between approximately 100 MHz and 1 GHz.

The system 10 further comprises a plurality of label-like transponders 18, of which one is shown. Each transponder 18 is affixed to an object such as a briefcase 20, which is to be located. If the transponder 18 is energised by the energising signal 16, as will be described in greater detail below, the transponder 18 is activated and radiates a returned signal 22 which is received by the antenna means 14 of the transceiver unit 12. The returned signal 22 is at a significantly different frequency from the energising signal 16 in order to screen out unwanted reflections and to reduce crosstalk between the transmitter and receiver of the transceiver unit 12. Hence, for example, the returned signal 22 is at a frequency which is an harmonic of the energising signal 16. Preferably, the returned signal 22 is at a frequency which is the third harmonic frequency of the energising signal 16.

Figure 3:
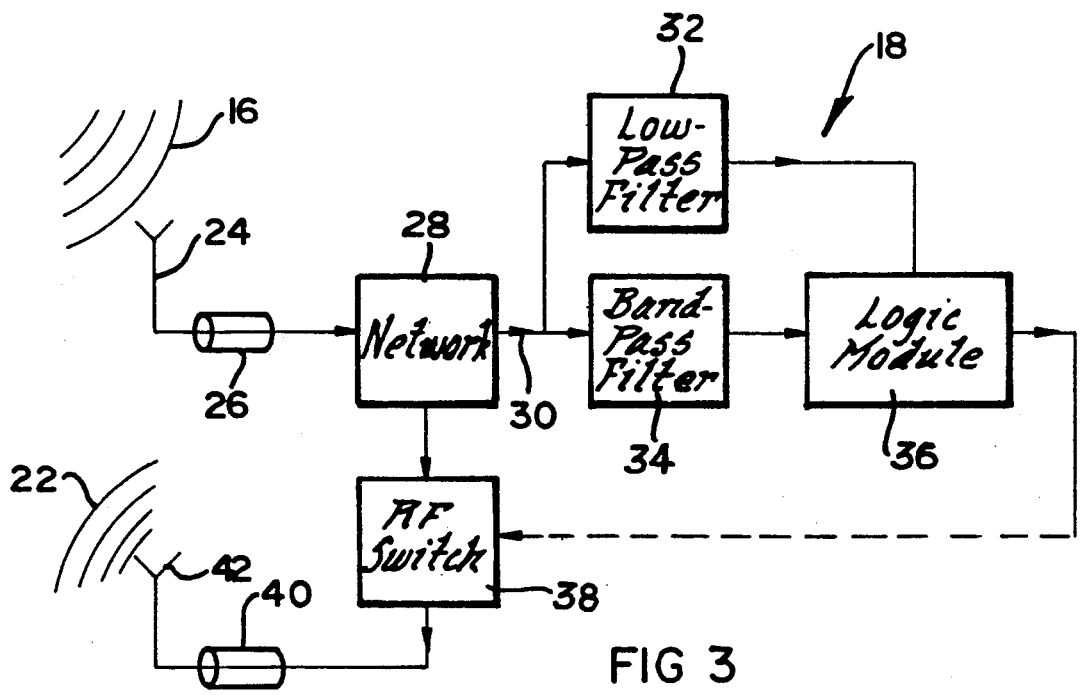
FIG. 3 shows a block diagram of a transponder of the locating system.

Referring now to FIG. 3 of the drawings, a block diagram of the transponder 18 is illustrated. The transponder 18 comprises a reception antenna 24 tuned to the frequency of the energising signal 16. A signal received by the antenna 24 is fed by a transmission line or co-axial line 26 to a non-linear network 28. The non-linear network 28 processes the signal from the antenna 24 and a signal output from the non-linear network 28 on line 30 is fed to a low-pass filter 32 and to a band-pass filter 34. Outputs of the low-pass filter 32 and the band-pass filter 34 are fed to a logic circuit or module 36 which is described in greater detail below. A signal from the non-linear network 28 which is the third harmonic of the signal 16 is also fed from the non-linear network 28 to an RF switch 38. The RF switch 38 is controlled by the logic module 36.

The purpose of the low-pass filter 32 is to condition, in conjunction with the non-linear network 28, the RF energy received by the antenna 24 so as to serve as a OC power source for the logic module 36.

The purpose of the band-pass filter 34 is to extract, in conjunction with the non-linear network 28, a digital code modulated on the energising signal 16, as will be described below.

A signal output from the RF switch 38 is fed via a transmission line or co-axial line 40 to a transmission antenna 42 from which the returned signal 22 is transmitted to the antenna means 14 of the transceiver unit 12.

Figure 4:
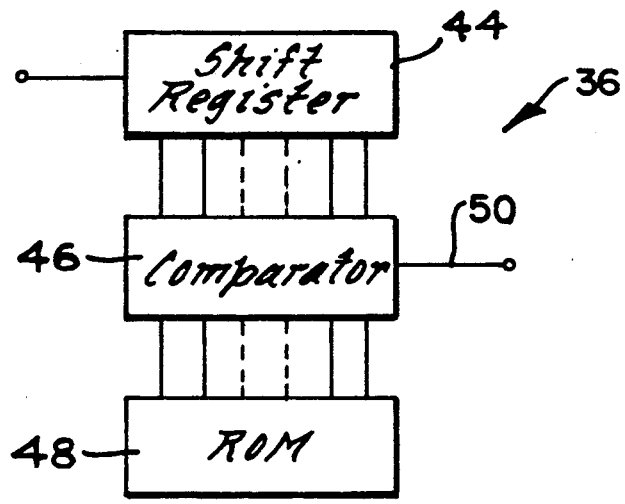
FIG. 4 shows a block diagram of a logic circuit of the transponder of FIG. 3.

Referring now to FIG. 4 of the drawings, a block diagram of the logic module 36, in its basic form, is illustrated. The logic module 36 comprises a shift register 44 having a serial input and a parallel output. The output of the shift register 44 is connected to a digital comparator 46 which, in turn, is connected to a Read Only Memory (ROM) 48.

In this form, the logic module 36 receives a serial code from the transceiver unit 12 via the non-linear network 28 and the band-pass filter 34. This serial code is shifted into the register 44 and the parallel output from the register 44 is compared with a permanent identification code for that particular transponder 18 stored in the ROM 48 by means of the comparator 46. If a complete match between the serial code and the identification code stored in the ROM 48 is obtained, an output 50 from the comparator 46 changes state and switches on the RF switch 38 thereby allowing the third harmonic wave 22 to be transmitted thus acknowledging the detection of matching codes.

Figure 5:
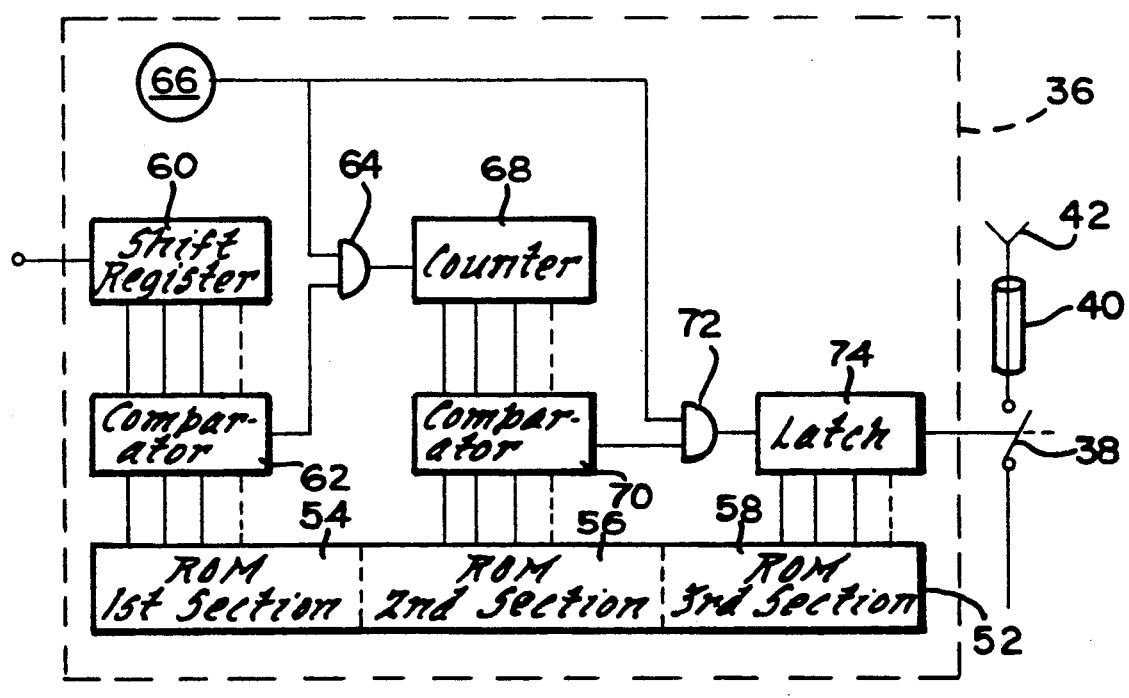
FIG. 5 shows a block diagram of a development of the logic circuit of the transponder.

Referring to FIG. 5 of the drawings, a development of the logic module 36 is illustrated. The purpose of this developed logic module 36 is to provide uses in application areas where very large numbers of transponders 18 have to be scanned within a limited time period and within a limited space without causing confusion from a multitude of responses, in order to identify individual members of a smaller group of labelled objects not known initially.

In this embodiment, the logic module 36 comprises a ROM 52. A category code is stored in a first section 54 of the ROM 52, a time-delay code is stored in a second section 56 of the ROM 52 and an individual identification code is stored in a third section 58 of the ROM 52. An input signal carrying a category code is fed serially into a shift register 60 and the parallel output of the shift register is compared with the category code stored in the section 54 of the ROM 52 via a digital comparator 62. An output from the digital comparator 62 is fed via an AND gate 64 where the signal is summed with a signal from a clock generator 66. The output from the AND gate 64 is input to a counter 68 and the output from the counter 68 is compared with a time delay code in the section 56 of the ROM 52 via a second comparator 70. An output from the comparator 70 is fed via an AND gate 72, where it is summed with a signal from the clock generator 66, to a latch or shift register 74. This latch 74 serves to convert the individual code contained in section 58 of the ROM 52, which is entered into latch 74 in a parallel mode, into a serial mode, which is fed to the control terminal of the RF switch 38. This causes the individual code to be modulated on the returned signal 22 transmitted by antenna 42.

The category code in the ROM 52 serves to activate a small group of transponders 18 out of a large population and the rest of the transponders remain deactivated during the scanning process. The "time delay" part of the ROM 52 serves to generate a time delay which is different for each individual transponder 18 in the group of transponders 18. This delays the transmission of the individual codes of each transponder 18 by varying amounts of time such that codes are received by the transceiver unit 12, one at a time. Since only a small group of transponders 18, rather than all the transponders 18, is relevant at any time, the span of time delays need not be excessively long and the search operation can proceed relatively briskly.

Figure 6:
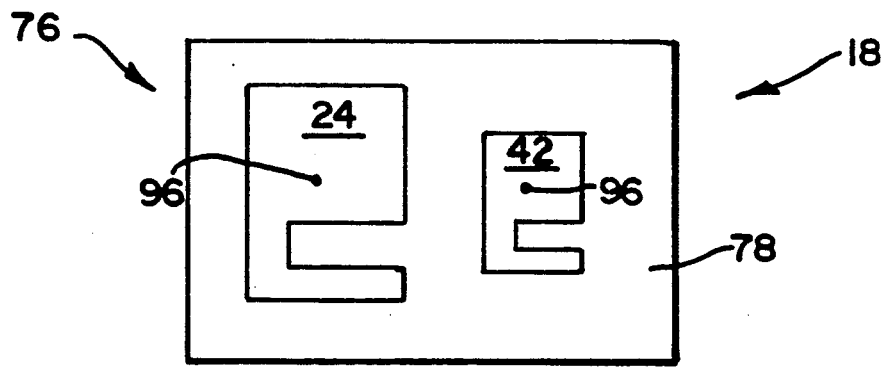
FIG. 6 shows a plan view of the transponder.
Figure 7:
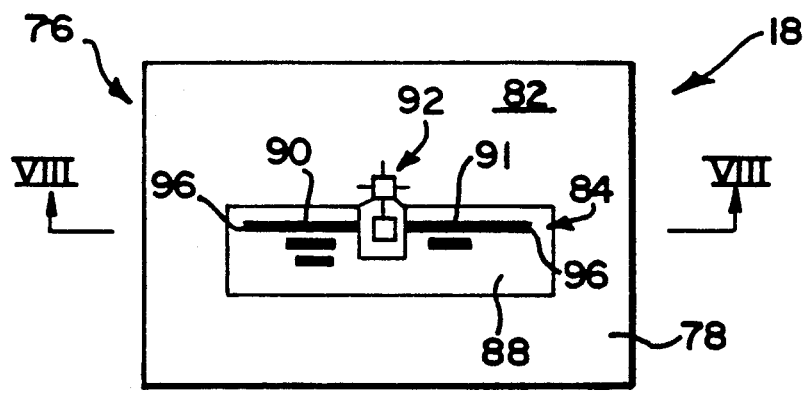
FIG. 7 shows a bottom view of the transponder.
Figure 8:
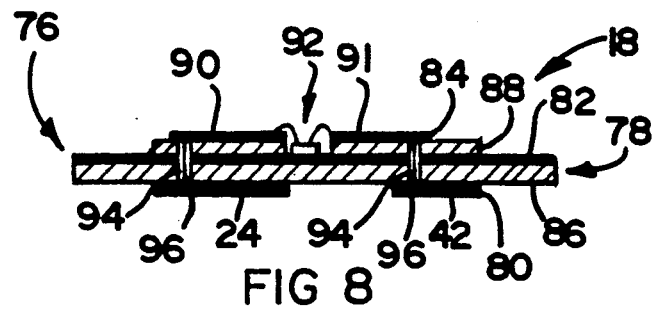
FIG. 8 shows a sectional view of the transponder taken along line VIII—VIII in FIG. 7.

Referring to FIGS. 6 to 8 of the drawings, the construction of the transponder 18 is shown in greater detail. The transponder 18 comprises the receiving antenna 24 in the form of a patch antenna as well as the transmission antenna 42 which is also in the form of a patch antenna. In the embodiment illustrated, the patch antennas 24, 42 are in the form of C patches, but, instead, they may be elliptical. The antennas 24 and 42 are to be as small as possible and must be relatively thin or flat in one dimension in order to disturb the surface contours of the marked object minimally. Further, the antennas 24, 42 are matched to striplines 90 and 91, respectively, which correspond to the transmission lines or co-axial lines 26, 40, respectively. Further, it is important that the antennas 24 and 42 be as omni-directional as possible in order to operate effectively despite the orientation of an object to which the transponder 18 is affixed relative to the transceiver unit 12.

Each transponder 18 is in the form of a label 76. The label 76 consists of a multi-layer card 78 comprising a first metal layer 80, a second metal layer 82 and a third metal layer 84. A layer 86 of a dielectric material is sandwiched between the metal layers 80 and 82 and a further layer 88 of dielectric material is sandwiched between the metal layers 82 and 84.

The antennas 24, 42 are etched out of the metal layer 80. The middle metal layer 82 constitutes a continuous ground layer, while the stripline or microstrip line connections 90 and 91, filters, directional couplers, etc are etched from the third metal layer, 84. Chip component interconnects 92 are patterned in the metal layer 84 as well. The chips themselves are also bonded on this side of the card 78 but in clearances where electrical contact with the ground layer can be made.

Two feed through connections 94 are provided from antenna feed-points 96 to the microstrip lines 90 and 91 on the opposite side of the card 78.

Figure 9:
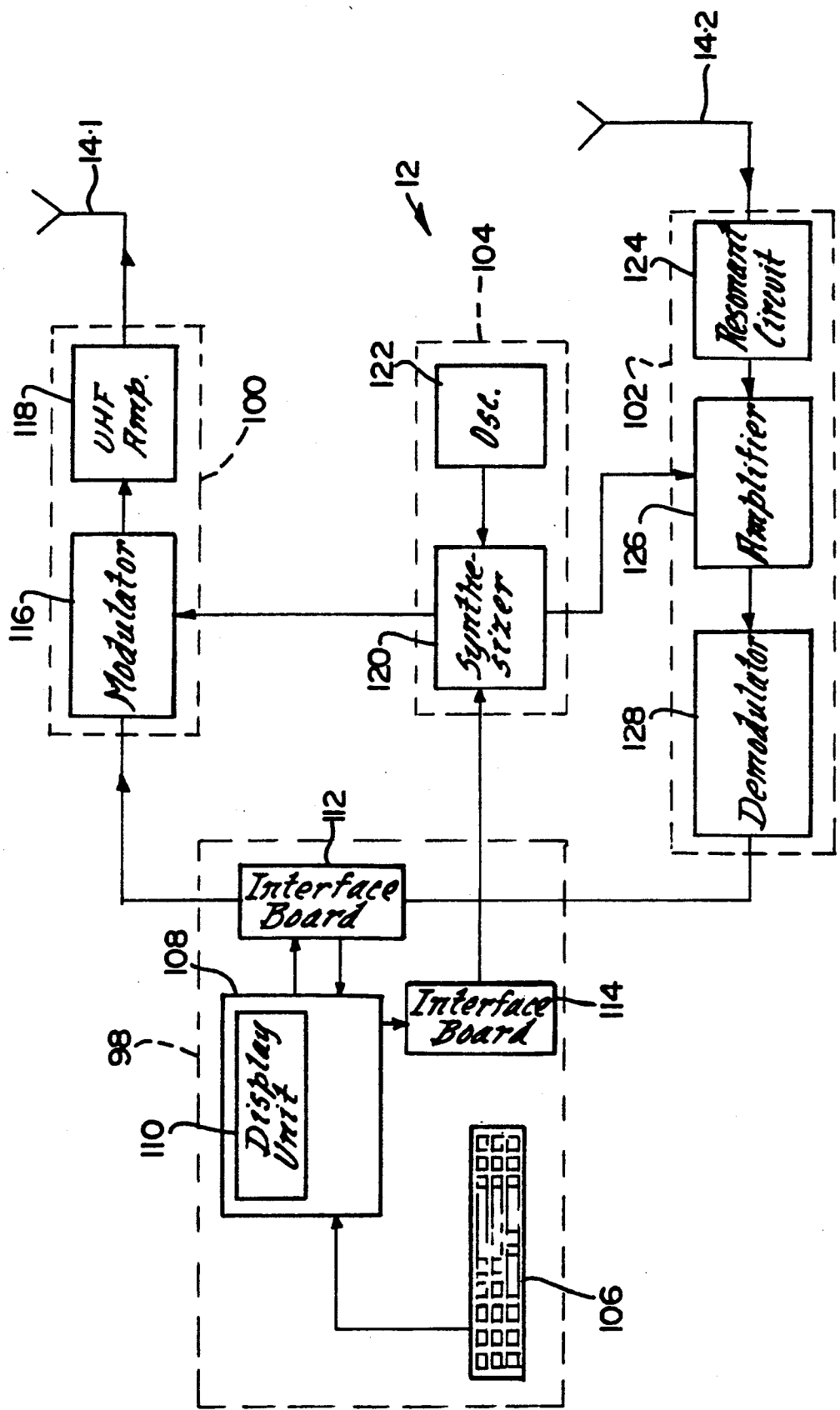
FIG. 9 shows a block diagram of a transceiver unit of the system.

Finally, FIG. 9 of the drawings shows a block diagram of the transceiver unit 12. The transceiver unit 12 comprises a control module 98, a transmitter module 100, a receiver module 102 and a frequency control module 104.

The control module 98 includes an entering means in the form of a keyboard 106 by means of which instructions are entered into the transceiver unit 12. The keyboard 106 is connected to an embedded microcomputer 108. The microcomputer 108 controls a visual display unit 110.

For transmitting signals, appropriate signals are sent from the computer via an interface board 112 to the transmitter module 100. The microcomputer 108 also receives signals from the receiver module 102 via the interface board 112.

The microcomputer is connected via a further interface board 114 to the frequency control module 104.

The transmitter module 100 includes a modulator 116 which is connected via a UHF amplifier 118 to a transmitting antenna 14.1 of the antenna means 14 (FIG. 1). The modulator 116 is used for modulating the signal 16 as described below.

The modulator 116 is controlled via a frequency synthesizer 120 of the frequency control module 104. The frequency synthesizer 120 receives control signals from the microcomputer 108 via the interface board 114 and receives a fixed frequency signal from a crystal oscillator 122.

The receiver module 102 comprises a resonant circuit 124 to which a receiving antenna 14.2 of the antenna means 14 (FIG. 1) is connected. The resonant circuit 124 is connected to an IF mixer and amplifier 126 which is controlled by the frequency synthesizer 120 of the frequency control module 104. An output of the mixer and amplifier 126 is connected to a demodulator 128 which feeds demodulated signals to the microcomputer 108 via the interface board 112. The frequency synthesizer 120 also controls the transmit and receive frequencies of the signals 16 and 22. It functions to obtain a fixed ratio, as described above, typically a ratio of 1:3, between the frequency of the transmitted signal 16 and the received signal 22.

It will be appreciated that the components of the transceiver unit 12 as well as of the transponder 18 are readily realisable to a person skilled in the art and, as such, are not described any further herein.

In use, data storage space of the microcomputer 108 of the transceiver unit 12 is loaded with identification codes and other relevant information of all the different transponders 18 of the system 10. A search operation for any specific transponder 18 can be conducted by selecting such transponder via the keyboard 106 of the transceiver unit 12. A search operation for any specific category of transponders can be initiated via the keyboard 106 in a similar way. The visual display unit 110 may display information on any transponder 18 located during a search operation.

The energising signal 16 is transmitted via antenna 14.1 of the antenna means 14 of the transceiver unit 12. The energising signal 16 is in the UHF frequency range to enable narrowbeam transmit and receive antennas 14.1 and 14.2 to be used with the transceiver unit 12. It will be appreciated that the narrower the beam of the antennas 14.1 and 14.2, the more directional the antennas 14.1 and 14.2 will be. Hence, by moving the transceiver unit 12 about on receipt of a response from a transponder 18, the strength of the signal 22 will vary and an indication of the direction from which the signal 22 originated can be obtained. It will be appreciated by those skilled in the art that an antenna with a narrow beam will need to be sealed inversely proportionally to the frequency of the signals or the smaller the desired physical size of the antennas 14.1 and 14.2, the higher the frequency of the energizing signal needs to be. In addition, energy transfer efficiency for powering the electronics of the transponder 18 can be more readily achieved by means of a signal in the UHF frequency range.

Figures 2A, 2B, 2C:
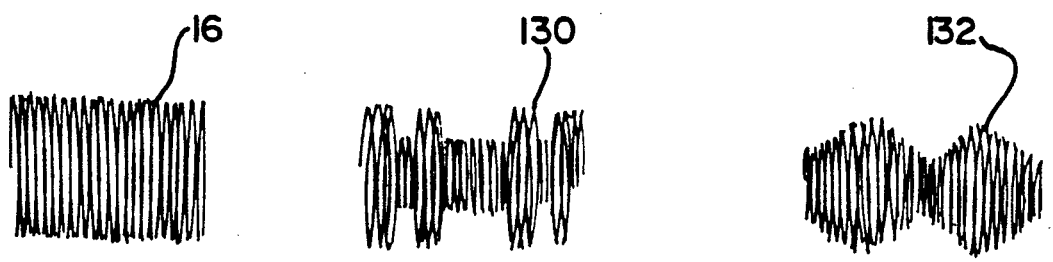
FIGS. 2A, 2B and 2C show waveforms of signals generated by a transceiver unit of the locating system.

The energising signal 16 has a waveform substantially as shown in FIG. 2A of the drawings, i.e. a constant amplitude carrier wave of the desired frequency.

Thus, the transceiver unit 12 transmits the energising wave 16 having the waveform shown in FIG. 2A. In the case where transponders 18 are sparsely distributed, this mode can be used for a walk around type of search. Any transponder 18 will re-emit a signal, i.e. the returned signal 22 when within the range and within the beamwidth of the antenna 14.1 of the transceiver unit 12. The direction of the transponder 18 can be accurately determined by seeking the direction of maximum response.

In the case where there is a high concentration of transponders 18, the selected identification code of a particular transponder 18 to be located is modulated on the energising wave 16 to provide a waveform 130 as shown in FIG. 2B of the drawings via the operation of the microcomputer 108 controlling the modulator 116. This will first de-activate all transponders 18 within range of the transceiver unit 12. After the total identification code has serially been entered into the logic circuitry 36 of the transponder 18 and a complete match with its internal recorded code has been detected as described above, that particular transponder 18 will again be activated. All other transponders 18 with non-matching codes within the range of the transceiver unit 12 will remain de-activated and will not interfere with any subsequent communication between the transceiver unit 12 and the specific transponder 18. Thus, it will then be possible to determine the direction of the specific transponder 18 with sufficient accuracy without interfering signals arising from elsewhere. In many applications this will be sufficient to locate the marked object 20.

When it is necessary to make a range determination in respect of a particular transponder 18, a sinusoidal waveform is modulated on the energising signal 16 to provide a waveform 132 as shown in FIG. 2C of the drawings. This step should be taken immediately after the transmission of the waveform 130 to ensure that all non-selected labels are still de-activated. By use of the sinusoidal waveform 132, or a sequence of such waveforms of different frequencies, a range determination in respect of a particular transponder 18 can be made.

Hence, it is an advantage of the invention, that a low cost locating system 10 and method are provided. The transponders 18 are physically small and thin and will interfere minimally with the object 20 on which such a transponder is mounted. Further, the transponders 18 are not battery-operated and should thus not degrade with time or need maintenance or adjustment. Also, the system 10 is operable in a cluttered environment having many reflecting surfaces, etc. In addition, a large number of transponders 18 can be used in close proximity to one another without mutual interference. Finally, by means of the system 10, the Applicant believes that it will be possible to determine the position of a specific object 20, carrying the necessary transponder 18, from a predetermined distance. transmitted.

I claim:

1. A locating system for locating predetermined labelled objects which includes
   a transceiver unit which comprises a narrow beamwidth antenna means for transmitting an energising signal at a predetermined first frequency and for receiving a returned signal at a predetermined second frequency from an object to be located, the energising signal incorporating a predetermined transponder category code for activating members of a predetermined group of labelled objects; and
   a plurality of label-like transponders, each of which is affixable to an object to be located, each transponder including logic circuitry, the logic circuitry including a memory means in which a category code is stored for activating the transponders of the said members when they receive the transponder category code, the logic circuitry further including a time delay means and a transponder identification code such that, upon the members of the group of transponders being activated, each transponder radiates its returned signal, including the transponder identification code, to the transceiver unit in a time delayed manner so that the returned signals are received serially by the transceiver unit.

2. The system as claimed in claim 1 in which each transponder is substantially omni-directional in order to operate effectively irrespective of the orientation of the object to which it is affixed relative to the transceiver unit.

3. The system as claimed in claim 2 in which each transponder includes a patch antenna.

4. The system as claimed in claim 1 in which the logic circuitry comprises a register means for receiving the transponder category code from the transceiver unit via the energising signal.

5. The system as claimed in claim 4 in which the logic circuitry includes a comparator for comparing the received transponder category code with the category code stored in the memory means of the logic circuitry.

6. The system as claimed in claim 4 in which each transponder includes a switching means which is controlled by the logic circuitry, the switching means being activated by the logic circuitry to cause the returned signal to be transmitted.

7. The system as claimed in claim 6 in which the switching means is an RF switch.

8. The system as claimed in claim 1 in which the transceiver unit is a portable unit.

9. The system as claimed in claim 1 in which the said predetermined first frequency of the energising signal falls within the UHF range.

10. The system as claimed in claim 1 in which the said predetermined second frequency of the returned signal is an harmonic of the frequency of the energising signal.

11. The system as claimed in claim 10 in which the frequency of the returned signal is the third harmonic frequency of the energising signal.

12. A method of locating predetermined labelled objects which includes
    affixing a label-like transponder to each object;
    modifying an energising signal to incorporate a predetermined transponder category code;
    transmitting the energising signal via a narrow beamwidth antenna means at a predetermined first frequency for activating the transponders of members of a predetermined group of labelled objects;
    comparing the transponder category code with a category code stored in a memory means of logic circuitry of each transponder; and
    causing each transponder of the group to radiate a returned signal incorporating a transponder identification code at a predetermined second frequency in a time delayed manner so that the returned signals are received serially by the antenna means, 13. The method as claimed in claim 12 which includes transmitting the signal at a frequency in the UHF range and causing each returned signal to be radiated at a frequency which is an harmonic of the energising signal.

14. The method as claimed in claim 13 which includes causing each returned signal to be radiated at a frequency which is the third harmonic frequency of the energising signal.

15. The method as claimed in claim 12, which includes modifying the energising signal by modulating the predetermined transponder category code onto the energising signal.

16. The method as claimed in claim 12 which includes further modifying the energising signal in order to enable a range determination to be made.

17. The method as claimed in claim 16 which includes further modifying the energising signal by modulating a predetermined waveform onto the energising signal.

* * * * *

UNITED STATES PATENT AND TRADEMARK OFFICE
CERTIFICATE OF CORRECTION

PATENT NO.  : 5,214,410
DATED       : May 25, 1993
INVENTOR(S) : Theunis C. Verster It is certified that error appears in the above-identified patent and that said Letters Patent is hereby corrected as shown below:

Column 3, line 63, "OC" should be --DC--.

Column 7, line 43, delete "transmitted.".

Column 8, line 48, Claim 12, "," should be --.--.

Signed and Sealed this

Third Day of May, 1994

Attest:

BRUCE LEHMAN

*Attesting Officer*  *Commissioner of Patents and Trademarks*